United States Patent
Mereness et al.

[11] 3,882,581
[45] May 13, 1975

[54] COATED, PARTIALLY LAMINATED CARBIDE CUTTING TOOL INSERT

[75] Inventors: Charles E. Mereness, Arden Hills; Gerald R. Abrahamson, White Bear Lake, both of Minn.

[73] Assignee: Minnesota Mining and Manufacturing Company, St. Paul, Minn.

[22] Filed: Mar. 13, 1974

[21] Appl. No.: 450,579

[52] U.S. Cl. ............................................. 29/95 A
[51] Int. Cl. ............................................. B26d 1/00
[58] Field of Search ................ 29/95 A, 95 C, 95 R; 76/101 R, 101 A, 104 R, 104 A

[56] References Cited
UNITED STATES PATENTS

| | | | |
|---|---|---|---|
| 3,344,496 | 10/1967 | Patkay | 29/95 R |
| 3,482,295 | 12/1969 | Trent | 29/95 R |
| 3,616,506 | 11/1971 | Ekemar | 29/95 R |
| 3,755,866 | 9/1973 | Ohlsson | 29/95 C |

*Primary Examiner*—Harrison L. Hinson
*Attorney, Agent, or Firm*—Alexander, Sell, Steldt & DeLaHunt

[57] ABSTRACT

A coated, laminated, crater-resisting composite cemented carbide cutting tool insert having a cemented metal carbide body which has an edge wall shaped to define a flank and cutting edge. The body has a recess filled with a lamina to define the rake face. The edge wall comprises flank wear resistant material and the rake face comprises a crater-resistant material of cemented carbide containing tungsten carbide and at least one carbide of a metal contained in Groups IVb or Vb of the periodic table. The flank and rake faces are coated about the cutting edges of the cutting insert with a hard surface coating, e.g. titanium carbide, said hard surface coating being about 0.0025-to-0.025 millimeters thick.

12 Claims, 3 Drawing Figures

COATED, PARTIALLY LAMINATED CARBIDE CUTTING TOOL INSERT

BACKGROUND OF THE INVENTION

1. Field of the Invention

This invention relates to laminated carbide cutting tool inserts. In one aspect, it relates to coated carbide cutting tool inserts. In yet a further aspect it relates to laminated carbide cutting inserts which have only a portion of the rake face laminated.

2. Description of the Prior Art

An example of a laminated carbide tool tip is disclosed in U.S. Pat. No. 3,482,295 issued Dec. 9, 1969 to E. Trent where a cemented carbide core has a thin layer of a more crater-resistant cemented carbide disposed on the core's rake face. The thin layer contains a substantial portion of at least one carbide formed from a metal of Groups IVb or Vb of the periodic table. This construction was an improvement in the art but such structures fail quickly under the high speed machining conditions commonly used in industry today. A primary mode of failure is high temperature plastic deformation of the cutting edge which is necessarily of a material composition which provides a compromise among deformation resistance, wear resistance and toughness.

U.S. Pat. No. 2,121,488 issued June 21, 1938 to Ritzau discloses a laminated carbide cutting tool with only a portion of the rake face laminated. The laminate has a supporting base and cutting edge of a first carbide composition and a laminated portion of a second carbide disposed on the rake face of said first carbide. Such structures, like Trent, represented an improvement in the art but fail rapidly under today's higher speed machining conditions.

Titanium carbide coatings for cutting inserts are known, e.g. U.S. Pat. No. 3,616,506 issued Nov. 2, 1971 to Ekemar discloses a method for forming a titanium carbide coating of 2–6 microns on a cemented carbide core. These tools, though generally superior to laminated tools, also fail rapidly under today's higher speed machining conditions.

A method for producing hard-surface coatings, e.g. carbides of or nitrides of metals is disclosed in U.S. Pat. No. 2,884,894 issued May 5, 1959 to Ruppert et al.

SUMMARY OF THE INVENTION

The present invention is a coated, partially laminated cutting tool insert which is highly resistant to failure under high speed machining conditions. The term "partial laminate" or "partially laminated" herein refers to coated insert substrates which are laminated in such a manner as to provide different compositions in the areas comprising (1) the cutting edge and (2) the crater wear area. The tool insert has a cemented metal carbide body having an edge wall, the body containing a majority of tungsten carbide and possibly other metal carbides bonded with an iron-group metal, e.g. cobalt, nickel or iron providing a tough, deformation resistant material which can withstand the stresses of machining. The body has a recess which is filled with a lamina, said lamina comprising a crater-resistant cemented carbide and defining the rake face. The crater-resistant carbide contains a majority of tungsten carbide and substantial amounts of an additive carbide of a metal chosen from Groups IVb and Vb of the periodic table; the percentage of the Group IVb and Vb carbides is greater in the crater-resistant layer than in the core material. The insert's rake face and flanks are coated with a hard-surface coating having a thickness of no more than 0.001 inch.

BRIEF DESCRIPTION OF THE DRAWING

A further understanding may be had by referring to the accompanying drawing wherein like reference numerals refer to like parts and in which.

DESCRIPTION OF THE PREFERRED EMBODIMENTS

Figure 1:
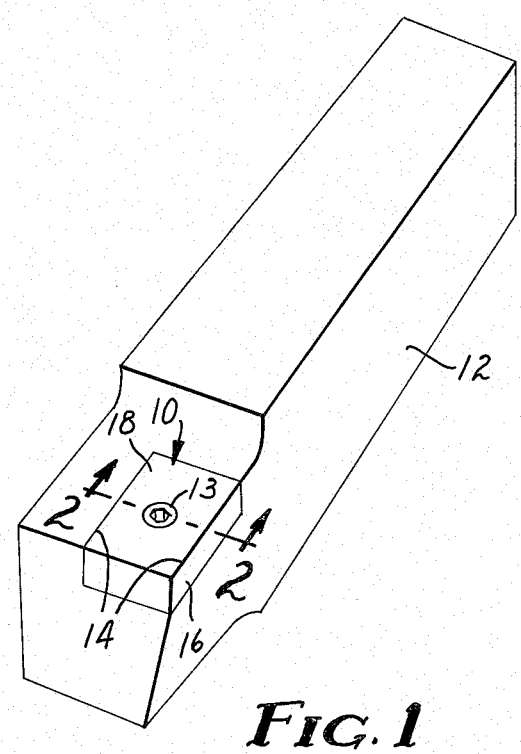
FIG. 1 is a perspective view of a cutting tool with a coated, partially laminated insert of this invention carried therein.

A coated, partially laminated carbide tool insert 10 of this invention is mounted securely in tool holder 12 (adapted to be placed in a machine such as a lathe) by screw 13 which mates with a complementary set of threads in the holder. When placed in a machine, the insert 10 presents a cutting edge 14 at the intersection of a flank 16 and a rake face 18 to the work piece to be machined. During machining chips cut from the work piece moving across the rake face 18 will tend to wear a depression or crater on the rake face in the area behind the cutting edge; abrasion of the work piece along flank 16 causes flank wear. Both types of wear contribute to failure of the insert and substantially shorten its useful cutting life.

Figure 2:
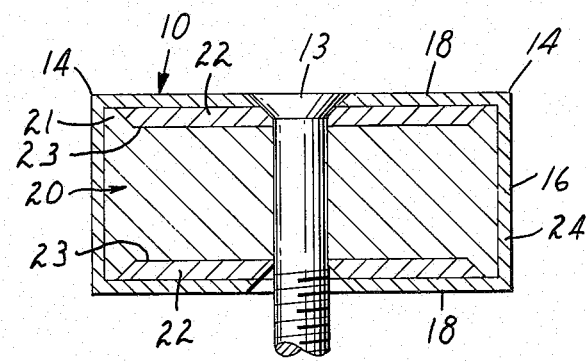
FIG. 2 is a cross-sectional view of FIG. 1 taken along line 2-2.
Figure 3:
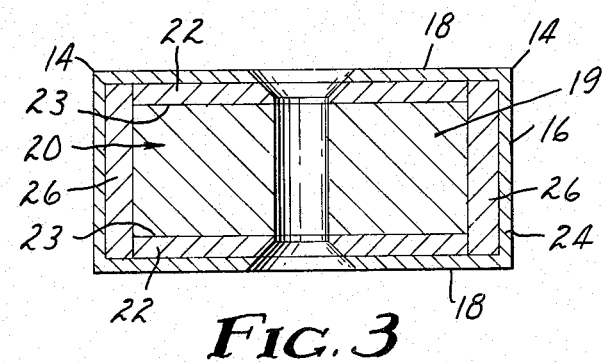
FIG. 3 is a cross-sectional view of a different embodiment of this invention.

As shown in FIGS. 2 and 3, both faces 18 of the insert 10 can form usable rake faces, the insert being turned over when the cutting edges 14 on the first face are worn. Such reversible inserts are known in the art and can have many geometric shapes, e.g. triangular, square, etc. In FIG. 2 a cemented metal carbide body 20 has a generally rectangular core portion and an edge wall 21 about the core. The edge walls have protrusions which form the flank face and cutting edges 14 on the body which support a coating 24 covering the flank face, rake face and associated cutting edge 14. Disposed in the recess defined by the protruding edge wall of the body is lamina 22 of a crater-resistant cemented carbide bonded to surfaces 23 of the body 20 to form a partially laminated cemented carbide composite. The composite of body 20, edge walls and lamina 22 is further coated with a hard-surface coating 24, e.g. titanium carbide, which is shown covering the entire laminated substrate, but in all cases would cover at least the rake face 18 and flank 16 of the substrate about a cutting edge.

FIG. 3 discloses an insert configuration where both the edge wall of the body and the lamina forming the rake face comprise cemented carbides of different composition from the core. The body 20 comprises a core 19 and the cutting edge 14 is formed by the edge wall 26 which surrounds the core 19 and is of a composition particularly resistant to flank wear, deformation and edge chipping. The crater-resistant lamina 22 in the recess formed by body 20 and edge wall 26 protects the rake face 18 from fast cratering during use. The substrate formed by body 20, edge wall 26 and lamina 22 is further coated with metal carbide 24 as in FIG. 2.

The body 20 is formed of material comprising a major portion of tungsten carbide and a minor portion of a binder metal chosen from the iron group consisting of iron, nickel, cobalt and mixtures thereof. In general, cobalt is the preferred binder because of its superior chemical compatibility and is the binder most often used by those skilled in the art. There may also be minor amounts of additive carbides of metals from Groups IVb and Vb of the periodic table, e.g. titanium, niobium, tantalum, etc. present in the cemented carbide core. The properties of the core material can be adjusted by varying the relative proportions of tungsten carbide, binder and additive carbides to provide a balance of toughness (to withstand the shock of rough cutting operations) and deformation resistance.

The core can contain 85–98 percent by weight of tungsten carbide, 2–15 percent by weight binder and up to 13 percent by weight of carbides of metals from Groups IVb and Vb of the periodic table. In general, the core is toughest when it comprises only tungsten carbide and cobalt, the preferred composition.

The body material can be shaped to form the edge wall 21 and the cutting edge 14. The core material is superior to the crater-resistant material in strength and deformation resistance. The configuration of the insert of this invention places a tough material at the cutting edge where there is maximum tendency for chipping and places the crater-resistant material back slightly from the cutting edge where the cratering action of the chips is most severe. It is not necessary that the crater-resistant layer surface the entire rake face. Only that portion of the rake face which is subject to cratering as the machined chips move over the rake face needs to be surfaced by a crater-resistant lamina.

The crater-resistant lamina disposed on the body material is a cemented carbide comprising tungsten carbide, a binder (the binder being chosen from the iron group) and one or more additive carbides formed from the metals of Groups IVb and Vb. The additive metal carbides produce a material resistant to the formation of craters as the chips move over the rake face and will be present in from about 2 to 34 percent by weight, preferably 10 to 25 percent by weight. The most preferred additive metal carbides are TiC, the most crater resistant, and TaC, which provides high temperature strength and good high temperature machining properties, although other carbides can be present depending on the specific properties desired.

The body with its crater-resistant layer disposed on the rake face or faces can be formed in various ways. One method is compacting a mixture of powders having the desired composition of the finished core in a shaped die to form a shaped green core and then placing a layer of a second mixture of powders having the desired proportions for the crater-resistant layer on top of the shaped green core and compacting both mixtures to a green laminated structure followed by sintering the resulting green compacted laminate using standard techniques to form a finished cemented carbide material. As an alternative, previously formed, green unsintered layers of carbide materials having the desired proportions and configurations could be laminated and compacted together followed by sintering as above to form a partially laminated cemented metal carbide composite. Modifications and alternative methods for forming shaped cemented carbide inserts are well known in the art. Additional methods of forming the sintered material are found in U.S. Pat. No. 2,121,488 issued June, 1921 to Ritzau, the disclosure of which is incorporated herein by reference.

At least the rake face and flanks of the laminated carbide substrate of this invention are coated with hard surface coating having a thickness no greater than about 0.025 mm. and preferably about 0.0025-to-0.025 mm. Although thin, the hard material coating materially increases both the crater and flank wear resistance of the coated laminated insert of this invention when compared with the prior art uncoated laminated inserts. Acceptable hard coatings are composed of carbides, nitrides, borides and silicides of at least one of the metals of Groups IVb and Vb of the periodic table as well as mixtures thereof. Examples of hard coating materials include titanium carbide, titanium nitride, titanium carbonitride, titanium boride, tantalum carbide and tantalum nitride. The preferred materials are the carbides and nitrides of the metals of Groups IVb and Vb because of their commercial acceptance. Among the carbides and nitrides, titanium carbide is the most preferred carbide. Pure titanium carbide has excellent crater resistance but only limited strength; however, the laminated substrate under the titanium carbide coating supports and supplements the titanium carbide coating extending the useful life of the insert even after the titanium carbide coating has been abraded away. It is also thought in the art that a TiC coating reduces machining temperatures because of its low frictional coefficient even though it is a very thin coating and also provides protection from heat buildup in the cutting insert during cutting operations. A further hard material coating is aluminum oxide which when coated over the partially laminated carbide substrate of this invention produces a tool combining the toughness of the carbide with the wear resistance and low reactivity of the aluminum oxide.

A further understanding may be had by referring to the following illustrative example in which all parts and percentages are by weight unless otherwise noted.

EXAMPLE

Carbide cutting tool inserts of four general types were formed:

1. A sintered tungsten carbide core material without additional metal carbides;

2. a partially laminated structure comprising a core material having a crater-resistant layer on the rake face;

3. a partially laminated structure like 2 with a chemical vapor deposited coating of titanium carbide;

4. a core material like 1 having a vapor deposited titanium carbide coating.

A mixture of powdered metal carbide and cobalt powder having 0.5–3 micron diameters was extensively ball milled to thoroughly mix the powders, the mixture reduced at 700°C. in $H_2$, about 2 percent by weight of paraffin added as a lubricant and the resulting mixture was placed in a steel die and lightly compacted under a pressure of 4 t.s.i. (5.6 kg/sq.mm) to form a shaped body about 0.170 inch (4.32 mm) thick having raised edge walls like the configuration shown by core 20 in FIG. 2. The edge walls were raised about 0.030 in (0.760 mm) above the large flat surface 23 of the core forming a recess on the body.

A mixture of tungsten carbide, additive carbide and cobalt powders, were ball milled and two layers of mixed carbide sufficient to completely cover the shaped surfaces lightly compacted onto the previously formed shaped core and the resulting core and the lightly compacted powder pressed at 15 t.s.i. (21 kg/mm²) to compact and form a laminate.

The compacted laminates were heated in H₂ to 350°C. for about 1 hr. to remove the paraffin present forming a porous compacted material having about 60 percent theoretical density. The porous compacts were then sintered in vacuum to 1200°C. and as the temperature was raised to 1,550°C., the system is pressurized to 500 microns with argon to minimize the vaporization of cobalt from the compact and the compact sintered at 1,550°C. for 45 min. to form a sintered compact which is essentially fully dense.

The sintered compacts with their shaped body were diamond ground to a square configuration 0.500 in. (12.7 mm) on a side and about 1/8 in. (3.2 mm) thick, the crater-resistant material on the rake face being 0.012 in. (0.3 mm) thick on the ground laminated substrate tool. The exposed core material was about 0.004–0.007 in. (0.1-to-0.17 mm) wide forming a cutting edge on the rake face. The cutting edges had a radius of 0.001–0.002 in. (0.025-to-0.050 mm) on the finished laminate.

For the coated tool inserts, a thin coating of substantially pure TiC was chemically vapor deposited on the material to a coating thickness of about 0.0002–0.0003 in. (0.005-to-0.008 mm).

The specimens were tested for cratering and flank wear by mounting the inserts in a tool holder and then in a metal lathe. The inserts were used to cut an AISI 4142 alloy steel tube having a Rockwell C hardness of 35. The cutting was done at about 650 SFPM and taking a 0.062 in. (1.6 mm) deep cut at 0.010 IPR (inch per revolution (0.254 mm per revolution) feed. The time to 0.010 and 0.015 in. (0.25 and 0.38 mm) flank wear was measured.

Body edge wall and crater-resistant lamina compositions and wear data concerning combinations thereof are tabulated in Table 1.

TABLE I

| Sample | Body | Lamina | Cutting Edge | Coating | Flank Wear Time In Minutes To 0.010" | 0.015" |
|---|---|---|---|---|---|---|
| 1 | A | None | A | None | <1 | — |
| 2 | B | None | B | None | 2.5 | 4.6 |
| 3 | A | B | A | None | 0.6 | 0.8 |
| 4 | A | None | A | TiC | 8.0 | 9.4 |
| 5 | B | None | B | TiC | — | 4.8 |
| 6 | A | B | A | TiC | 10.5 | 15.0 |

A 94% WC and 6% Co.
B 72% WC, 8% TiC, 12% TaC and 8% Co.

The tabulated results show that the coated partially laminated insert of this invention, Sample 6, is markedly superior to the partially laminated materials, Sample 3 or coated materials, Sample 4 and 5. As shown the life obtainable from the insert of this invention strikingly exceeds the life obtainable from the separate components.

The invention has been described with respect to a particular embodiment. Various modifications and alterations may become obvious to those skilled in the art without departing from the spirit and scope of this invention. It is to be understood that the invention is not limited to the illustrative embodiment set forth herein.

What is claimed is:

1. A laminated, crater-resistant composite metal cutting tool insert formed of sintered metal carbide comprising:
   a body having a core and an edge wall shaped to define both a flank face and a cutting edge, said body having a recess filled with a lamina to define the rake face; wherein said edge wall comprises a flank wear resistant carbide material and said lamina comprises a crater-resistant material containing a majority of tungsten carbide, an iron group binder and at least one carbide of a metal from Groups IVb and Vb of the periodic table, and at least the rake face and flanks of said insert are coated with a hard-surface coating having a thickness of no more than about 0.001 inch.

2. The cutting tool insert of claim 1 wherein said core and said edge wall forming said cutting edge compose the same material composition, and said edge wall has a projecting portion forming said recess adjacent said cutting edge and opposite said flank face.

3. The cutting tool insert of claim 1 wherein said core and said edge wall shaped to define said cutting edge comprise different compositions.

4. The cutting tool insert of claim 1 wherein said hard-surface coating is a metal carbide formed from at least one of the metals of groups IVb and Vb of the periodic table.

5. The cutting tool insert of claim 4 wherein said coating is titanium carbide.

6. The cutting tool insert of claim 1 wherein said hard-surface coating is a metal nitride formed from at least one of the metals of groups IVb and Vb of the periodic table.

7. The cutting tool insert of claim 2 wherein said hard surface coating is a metal carbide formed from at least one of the metals of groups IVb and Vb of the periodic table.

8. The cutting tool insert of claim 3 wherein said hard surface coating is a metal carbide formed from at least one of the metals of groups IVb and Vb of the periodic table.

9. The cutting tool insert of claim 7 wherein said coating is titanium carbide.

10. The cutting tool insert of claim 8 wherein said coating is titanium carbide.

11. The cutting tool insert of claim 2 wherein said hard surface coating is a metal nitride formed from at least one of the metals of groups IVb and Vb of the periodic table.

12. The cutting tool insert of claim 3 wherein said hard surface coating is a metal nitride formed from at least one of the metals of groups IVb and Vb of the periodic table.

* * * * *